United States Patent
Hartmann et al.

(10) Patent No.: US 8,377,357 B2
(45) Date of Patent: Feb. 19, 2013

(54) METHOD FOR THE PRODUCTION OF A THERMOPLASTIC PLATE COMPRISING AT LEAST ONE SMOOTH EDGE, DEVICE THEREFORE, AND EDGE MACHINING SYSTEM

(75) Inventors: Markus Hartmann, Sendenhorst (DE); Helmut Jarosch, Sendenhorst (DE)

(73) Assignee: Veka AG, Sendenhorst (DE)

( * ) Notice: Subject to any disclaimer, the term of this patent is extended or adjusted under 35 U.S.C. 154(b) by 1150 days.

(21) Appl. No.: 10/577,181

(22) PCT Filed: Oct. 29, 2004

(86) PCT No.: PCT/EP2004/012293
§ 371 (c)(1),
(2), (4) Date: Apr. 25, 2006

(87) PCT Pub. No.: WO2005/044543
PCT Pub. Date: May 19, 2005

(65) Prior Publication Data
US 2007/0023953 A1  Feb. 1, 2007

(30) Foreign Application Priority Data

Nov. 4, 2003 (DE) .................... 103 52 112
Jun. 4, 2004 (DE) .................... 10 2004 027 561

(51) Int. Cl.
*B29C 35/02* (2006.01)
(52) U.S. Cl. ............... 264/210.2; 264/171.11; 264/175; 264/209.3
(58) Field of Classification Search ............... 264/171.1, 264/171.11, 173.1, 175, 210.2, 209.3, 210.5, 264/241, 280, 291
See application file for complete search history.

(56) References Cited

U.S. PATENT DOCUMENTS

| | | | | | |
|---|---|---|---|---|---|
| 3,429,959 | A | * | 2/1969 | Salhofer | 264/175 |
| 4,120,833 | A | * | 10/1978 | Purvis et al. | 521/81 |
| 5,589,243 | A | * | 12/1996 | Day | 428/56 |

FOREIGN PATENT DOCUMENTS

| | | |
|---|---|---|
| DE | 10352112 | 6/2005 |
| EP | 0303576 | * 12/1988 |
| EP | 88830299.9 | 2/1989 |
| JP | 51-131580 | 11/1976 |
| JP | 57-176131 | 10/1982 |
| JP | 57176131 | 10/1982 |
| JP | 2001-239596 | 7/2000 |
| JP | 2001239596 | 4/2001 |
| WO | WO2009/141383 | 11/2009 |

* cited by examiner

*Primary Examiner* — Christina Johnson
(74) *Attorney, Agent, or Firm* — Karl F. Milde, Jr.; Eckert Seamans Cherin & Mellott, LLC

(57) ABSTRACT

A thermoplastic board (20) comprising at least one smooth side edge (21) is produced by means of extrusion. The side edge of a synthetic web is heated at least to its melting temperature following calibration while the peripheral surface zones are kept at a temperature below the softening temperature by cooling. A smoothing device (10') for a side edge of the thermoplastic board encompasses a guiding groove (14') that is provided with at least one heating means (15'), located within the face (11'), and at least one respective cooling means (16', 17') located within the side surfaces (12', 13') that face each other. A cutting edge (21, 24) of a synthetic board (20) that can be guided inside the guiding groove (14') rests against the face (11') while the peripheral surface zones (22, 23) thereof lean against the side surfaces (12', 13').

3 Claims, 6 Drawing Sheets

METHOD FOR THE PRODUCTION OF A THERMOPLASTIC PLATE COMPRISING AT LEAST ONE SMOOTH EDGE, DEVICE THEREFORE, AND EDGE MACHINING SYSTEM

BACKGROUND OF THE INVENTION

The invention relates to a method for producing a thermoplastic board comprising at least one smooth side edge.

Integral foam boards exhibiting a core of a foamed synthetic and sealed smooth surfaces are known. The surfaces can be manufactured pore-free and with a great luster by extrusion, for example, of hard PVC, and can be used in numerous applications. A particular advantage is the low density of the board, which is reduced due to the porous core.

However, the board widths vary during the extrusion process such that for applications, where plane edge surfaces and exact edge radii are important, the edges must be trimmed laterally to achieve the desired board width. Although it is possible to obtain a precise and straight side edge in this manner, the structure of the layers, and in particular the core with its coarse porosity, is visible, which may look objectionable in contrast to the shiny dense surfaces of the board. In addition, dirt and bacteria may be deposited in the coarse pores of the cut edges, which is a disadvantage for the preferred fields of application of integral foam boards, such as sanitary areas, medical technology and emergency vehicles.

In addition, with solid synthetic boards, the side edges are not always burr-free and smooth after trimming.

Often, the cut-out boards must be installed such that the cut edges are not visible, for example by framing the edges in profiles.

SUMMARY OF THE INVENTION

The principal objective of the invention is to improve the method for the extrusion of a thermoplastic board, in particular of an integral foam board, of the type described above such that the boards are sealed and/or smoothed on at least one side edge.

This objective is achieved in that, following calibration, the side edge of the web is heated to at least the melting temperature while the peripheral surface zones are kept at a temperature below the softening temperature by cooling of the same.

The particular advantage of the present invention is that a precise and homogenous side edge is achieved by the simultaneous cooling of the peripheral surface zones of the synthetic board during the fusion process at the face area.

The fusion process together with a small contact pressure of the smoothing device results in exact shaping of the side edge, which is determined by the contour of the smoothing device. Existing irregularities such as scores are removed.

Integrating the steps of the method subject to the invention into a typical extrusion process leads to pulling the molten side edge along at the feed rate at the face side of the smoothing device and thus to a smooth side edge.

Through cooling, the dimensional stability is retained in the peripheral zones of the board in spite of the melting of the side edge. This avoids warping, bending or other damage of the large plane board surfaces.

In addition, the invention relates to a smoothing device for a side edge of a thermoplastic board suitable for carrying out the method.

As a guiding groove, a configuration is defined that can be pressed against the side edge to be smoothed and in which, at the same time, the peripheral surface zones of the board are guided. This guiding groove can be molded into a metallic object. However, it may also be formed, for example, from three dies for the face area oriented at right angles to one another and the two side areas that are connected to one another in some other fashion. Important is only the U-shaped configuration of the three areas mentioned, within which the board is guided.

To avoid heat conduction within the smoothing device as much as possible, at least one thermal insulation layer may be provided between the respective means for heating and cooling or between the face area and the side area.

It is particularly advantageous if at least one insulation zone is provided between one cross-sectional zone where a heating means is located and one cross-sectional zone where a cooling means is located, where said insulation zone is formed by a guiding groove or a borehole that stretches across a major portion of the length of the smoothing device.

The air layer located in the guiding groove or the borehole blocks the heat transfer to a large extent, such that the heat loss in the heating zone is essentially defined by the strongly reduced heat streams that flow across the connecting webs between the heating and the cooling zones. Thus, less heating energy is required for the heating zones and less energy for maintaining the temperature of the cooling means in the cooling zones. In addition, the greater temperature gradient is created at the treated side edge of a synthetic board, such that the dimensional stability of the cooled peripheral surface zones is increased and, at the same time, melting is accelerated due to the increased heat transfer into the side edges. Due to the improved cooling of the adjacent zones, the molten synthetic at the side edge will solidify faster, such that deformations after the run through the smoothing device are avoided.

A heat channel with a heated liquid such as oil, for example, flowing through it can be provided as a means of heating. The temperature of the liquid can be maintained exactly outside of the device, such that the heat transfer into the heating zone can be defined.

As an alternative, the heating means may be formed by at least one electrical heating cartridge. Its advantage over heating with a temperature-controlled liquid is a better and faster reacting temperature control. No direct heat losses of the heating means to the surroundings occur because the heating cartridge is integrated into the smoothing device using boreholes.

It has proven particularly advantageous if the heating means stretch across 0.4 to 0.6 times the length of the smoothing device. When heating only across about half of the length of the smoothing device, a zone of the smoothing device of about the same length remains which is cooled down but is no longer heated, enabling a cooling down of the thermoplastic material to below the softening temperature, while the side edges still run in the guiding groove of the smoothing device and are calibrated above it.

In particular, cooling channels with cooling liquids, especially water, flowing through them are provided as the means of cooling.

Preferably, the cooling channels are fed by a common cooling liquid lead line, such that a uniform temperature level can be achieved at the peripheral zones at the top and bottom sides of the synthetic board. For this reason, the cross-section of the smoothing device should be mirror-symmetrical, at least with regard to the cross-sectional areas for cooling.

To be able to re-machine existing board cuts, i.e., independent of the extrusion of continuous synthetic boards, an edge machining system with the features of Claim 15 or 16 is proposed additionally.

According to a first embodiment, the cut board is secured on a movable carriage of a guiding device and pulled through the stationary smoothing device.

According to a second embodiment, the synthetic board is secured stationary and is re-machined using a movable smoothing device, which is moved alongside the side edge.

Preferably, two smoothing devices are provided that are oriented symmetrical with regard to the direction of movement. In this manner, it is possible to finish two parallel edges at opposite sides simultaneously. This not only refers to rectangular cuts but also polygonal cuts with an even number of edges.

It is also advantageous if the carriage on which the board is secured, or the carriage that carries the at least one smoothing device, is provided with a rotating device. In this manner, it is possible to finish all edges in succession using only one smoothing device or one pair of symmetrical smoothing devices on opposite sides, without re-clamping the cut synthetic boards, even using automatic process controls.

To not only have the option of processing square cuts but also rectangular ones, preferably an adjustment device, acting perpendicular to the symmetry axis of the synthetic board, is provided for the at least one smoothing device. In this manner, the smoothing device can be moved and adapted automatically to the changed distance of one side edge after rotating the cut board.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
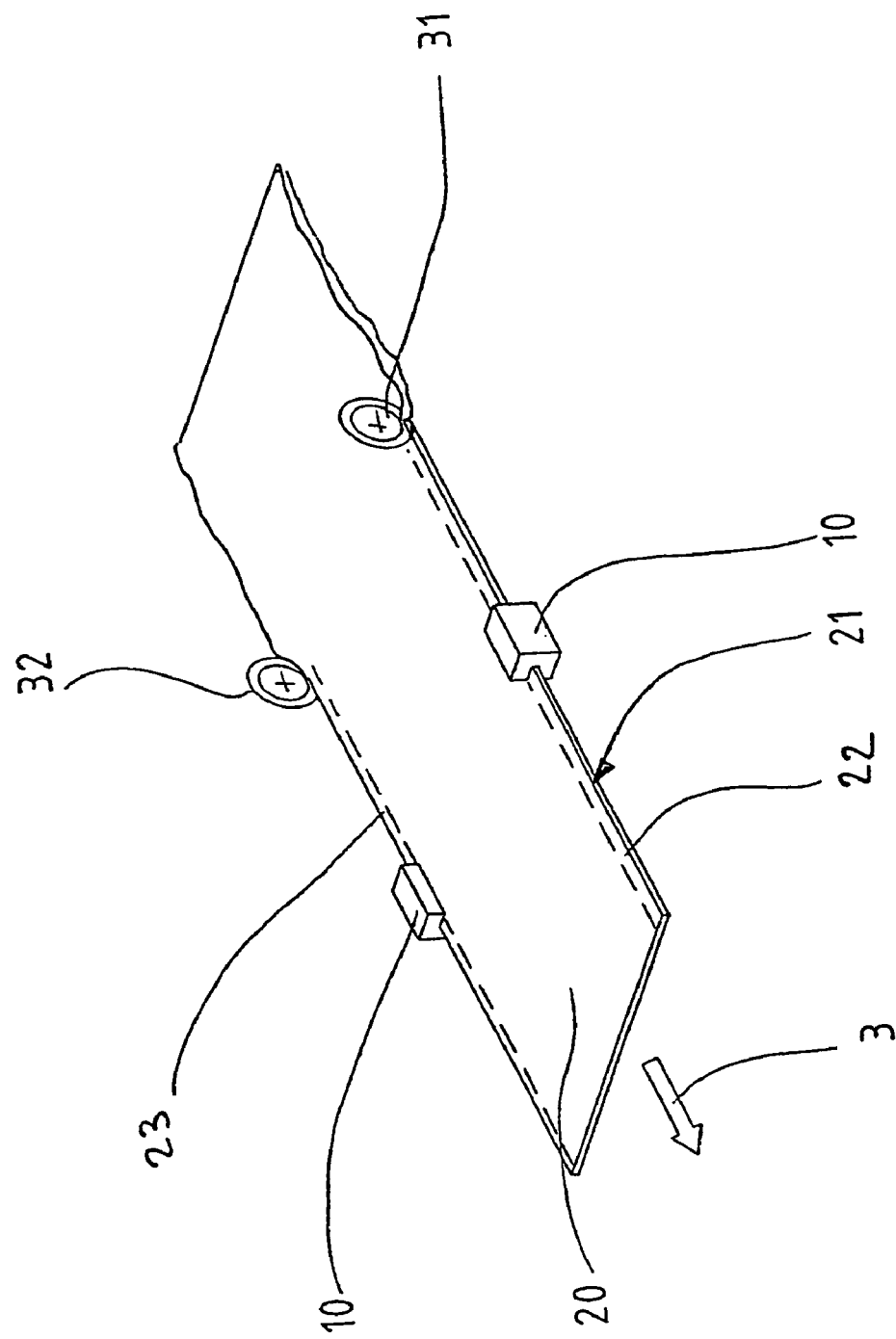
FIG. 1 is a schematic perspective view of a portion of a device for the manufacture of a synthetic board.
Figure 2:
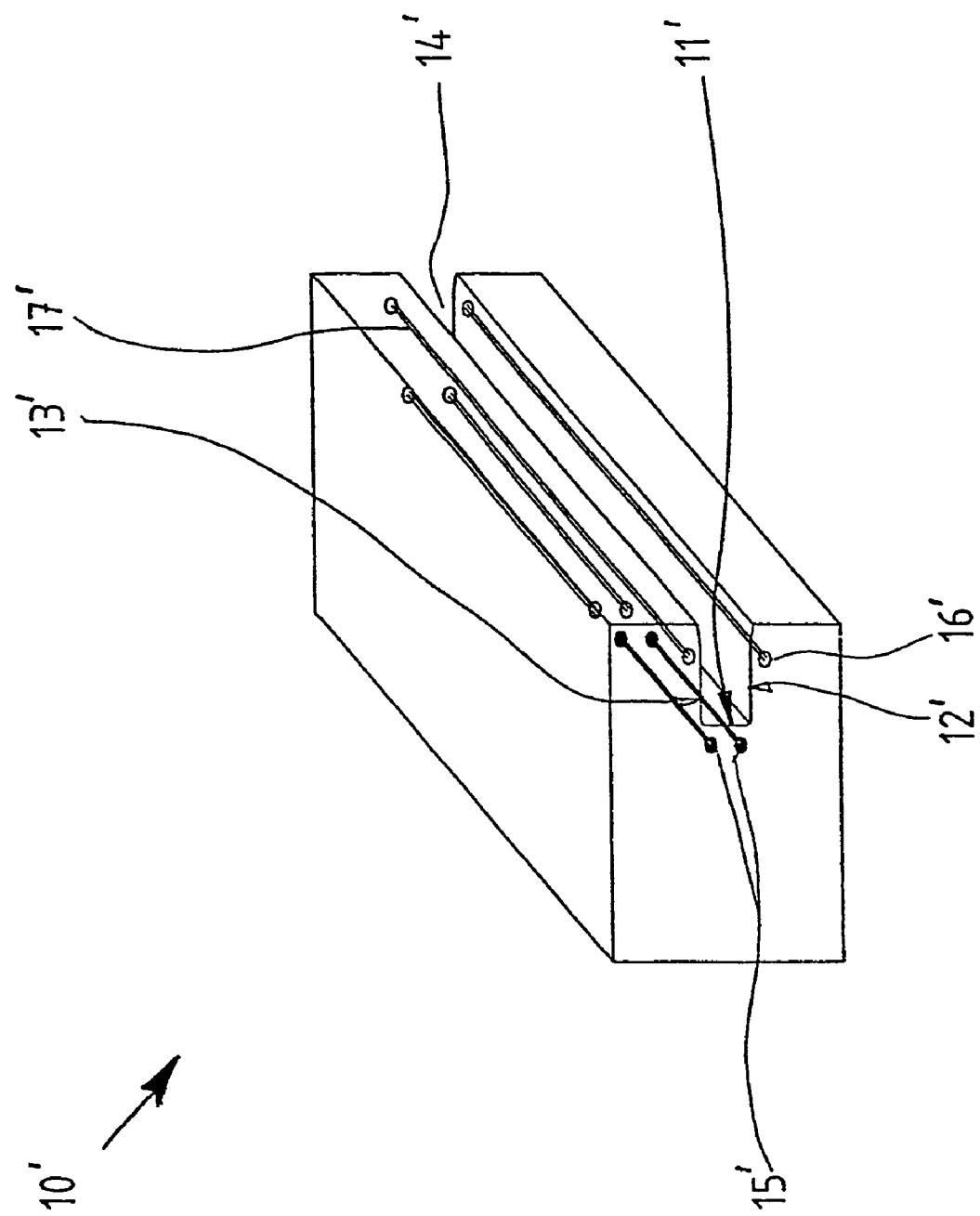
FIG. 2 shows a first embodiment of a smoothing device also in a perspective view.

The preferred embodiments of the present invention will now be described with reference to FIGS. 1-6 of the drawings. Identical elements in the various figures are designated with the same reference numerals.

FIG. 1 shows a synthetic board 20 of a thermoplastic synthetic, for instance an integral foam web, which is produced continuously using an essentially known—not shown—extrusion device.

In the embodiment shown, the side edges 21 of the synthetic board 20 are cut in a straight line using suitable cutting devices 32. At the side edges 21, smoothing devices 10 that partially melt the surface zones located at the side edges are pressed onto both sides viewed in the drawing direction and, in so doing, homogenize and smooth the side edges 21.

Where cutting of the side edge is not required, the untreated edge is guided to the smoothing device subject to the invention.

The peripheral zones 22, 23 at the side edges 21 are cooled when guided through the smoothing devices 10, such that they remain dimensionally stable. In this manner, the particularly high-gloss surfaces of the synthetic board 20 retain their shape and surface structure in the peripheral zones 22, 23.

FIG. 1 shows a smoothing device 10' subject to the invention, which is formed of a metallic or otherwise heat-conducting object, which exhibits a guiding groove 14'. The guiding groove 14' is defined by side areas 12', 13' and a face area 11', with the side areas 12', 13' being primarily oriented plane-parallel to one another but in a zone towards the outside of the smoothing device 10', are preferably slanted at a small angle to the center axis of the guiding groove toward the outside, such that an inlet slant is created. This transition avoids damage to the surface of the synthetic board 20 at the outer circumference of the smoothing device through scrape marks or the like. Here, the inlet slant refers to an expanding zone that may be formed by a plane area but also by a curved area. The latter offers the advantage that a continuous transition into the guiding groove, i.e., without an edge, is provided.

The face area 11' is heated by hot oil, which flows through heating channels 15', to a temperature of 130° C. to 250° C., in particular to about 185° C., such that a thermoplastic material such as hard PVC is melted in a localized area.

The length of the smoothing device is selected in relation to the drawing speed of the synthetic board 20 such that sufficient heat to reach melting temperature can be transferred during the contact of the side edge 21 with the face side 11, without affecting too great a heat transfer into the core layers of the board that lie behind the side edge 21.

To avoid too much of a heat transfer into the board, which could lead to a heating up of the peripheral zones 22, 23, thereby exceeding the softening point with a resulting deformation, the side areas 12', 13' in the guiding groove 14' are cooled using a cooling agent, in particular water, such that their temperature corresponds to about the surrounding temperature.

Figure 3:
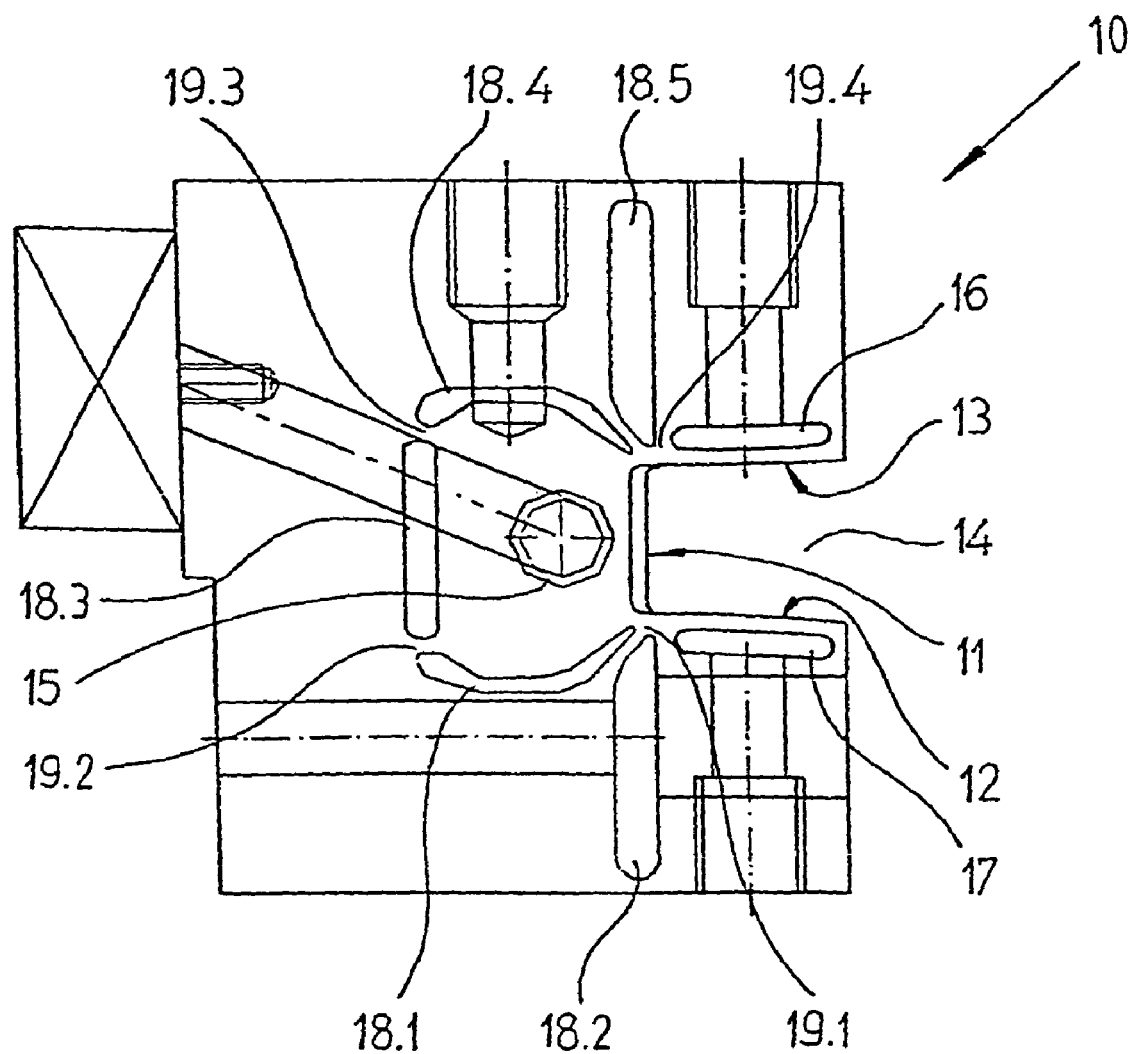
FIG. 3 is a front view of a second embodiment of the smoothing device.

FIG. 3 shows a second embodiment of a smoothing device 10, which, just like the first embodiment, is formed of a metallic or otherwise heat-conducting object exhibiting a guiding groove 14.

The face area 11 is heated by a heating cartridge.

The heating cartridge 15 is extensively shielded from the surrounding zones through recesses 18.1, . . . , 18.5, which stretch along the length of the smoothing device 10, against the other material zones of the smoothing device, in particular the cooling channels 16, 17.

The recesses 18.1, 18.3, 18.4, which can be made by eroding, form an arch-shaped clasp in the shown exemplary embodiment, with the open side of said clasp being directed towards the face area 11 of the guiding groove 14 to be heated.

Only narrow webs 19.1 . . . 19.4 of solid material exist between the recesses 18.1, 18.3, 18.4 and the guiding groove 14. These very narrow webs connect the heating cartridge 15 and the material zone surrounding it to the remaining cross-section of the smoothing device. However, the heat transfer across the narrow webs 19.1 . . . 19.4 is greatly restricted.

Additional recesses 18.2, 18.5 stretch parallel to the face area 11 and provide additional shielding of the heated cross-sectional zone of the smoothing device 10 located at the left in FIG. 3 and the cooled cross-sectional zones above and below the guiding groove 14 located to the right of it.

Figure 4:
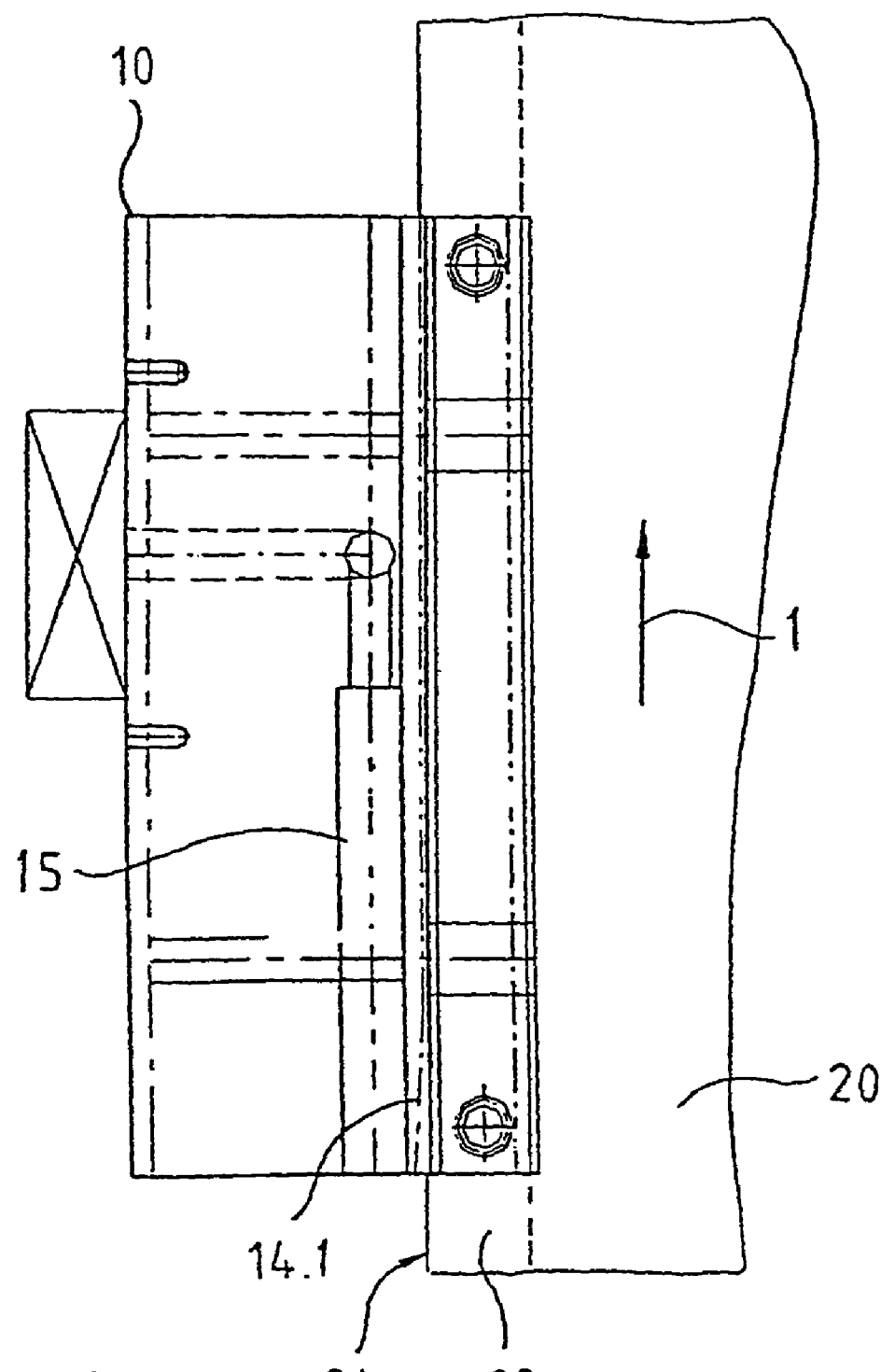
FIG. 4 is a top view of the smoothing device of FIG. 3.

As can be seen in particular in FIG. 4 in a top view with covered lines to the smoothing device 10, not only do the face areas jump at the peripheries towards the synthetic board to the outside, but also the guiding groove 14 at its beginning viewed with regard to the direction of movement 1, exhibits an inlet slant 14.1. Preferably, the transition from the inlet zone into the actual zone of the guiding groove is continuous, i.e., without an edge at the transition and thus without a sudden buckling of the molten side edge 21 of the synthetic board during re-machining.

In FIG. 4, it can also be noted that the heating cartridge 15 stretches across about half of the length of the smoothing device 10. However, the section of the smoothing device that in FIG. 4 is located above the heating cartridge 15 is also cooled above and below the guiding groove 14, such that solidification of the molten material zone occurs with simultaneous guiding and calibration in the guiding groove 14, before the molten zone of the side edge exits the smoothing device 10.

Figure 5:
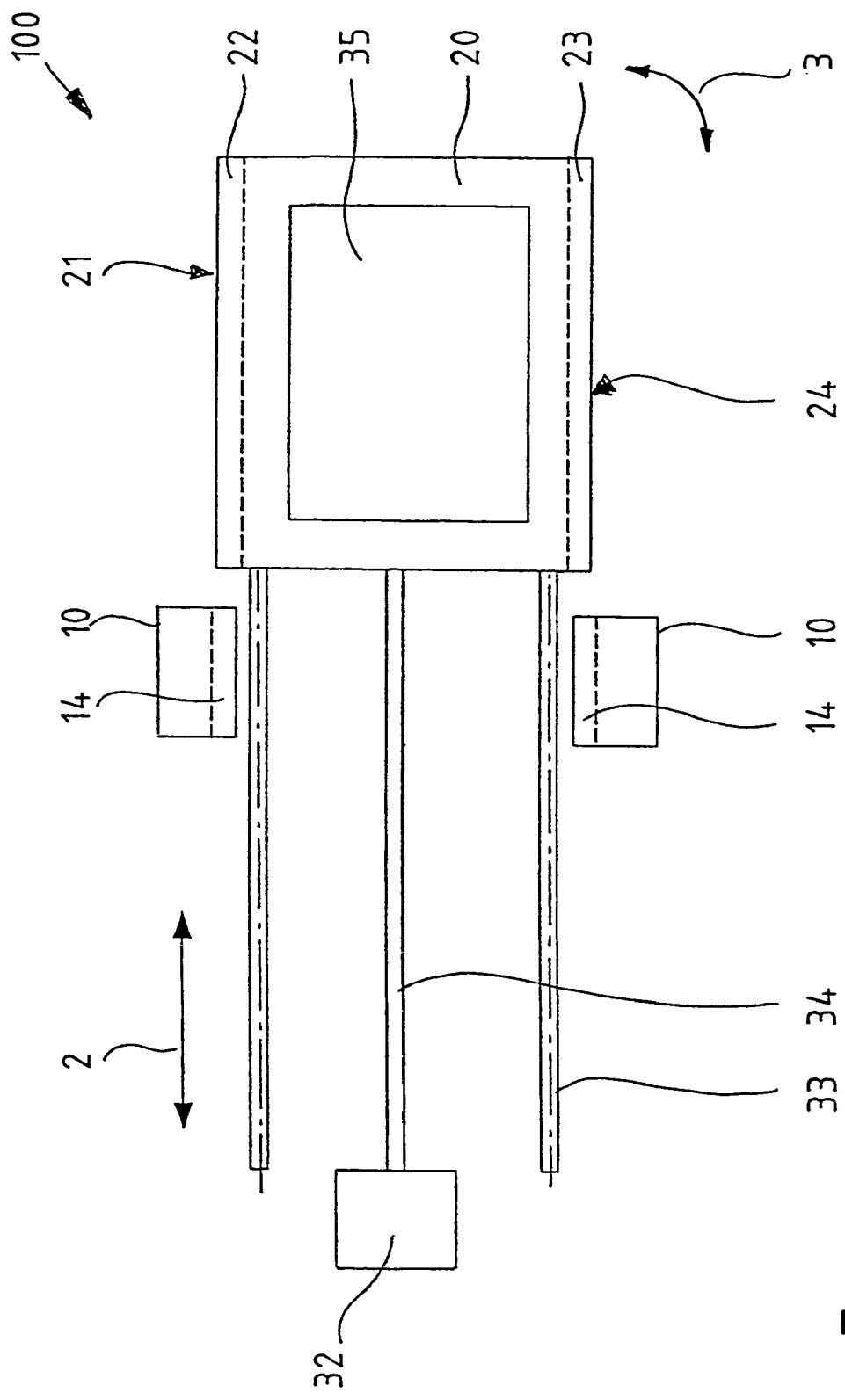
FIGS. 5 and 6 are schematic top views of two embodiments of an edge machining system.

FIG. 5 shows an edge machining system 100, comprising a drive device consisting of a motor 32, a guide 33 and a drive spindle 34, as well as a carriage with means 35 for securing a synthetic board 20.

The synthetic board 20 secured on the carriage can be moved in a direction of movement 2, whereby the side edge 21 and the peripheral surface zone 22 are pulled through the smoothing device 10 and are re-machined there.

Two smoothing devices 10 positioned mirror-symmetric to the direction of movement 2 allow for simultaneous treatment of the side edges 21, 24 located on opposite sides in the guiding grooves 14.

In addition, a rotating device may be provided with which the synthetic board 20 can be rotated relative to the carriage in the rotational direction designated with the number 3. In this manner, the other side edges of the synthetic board 20 can be re-machined as well after a 90° rotation.

Figure 6:
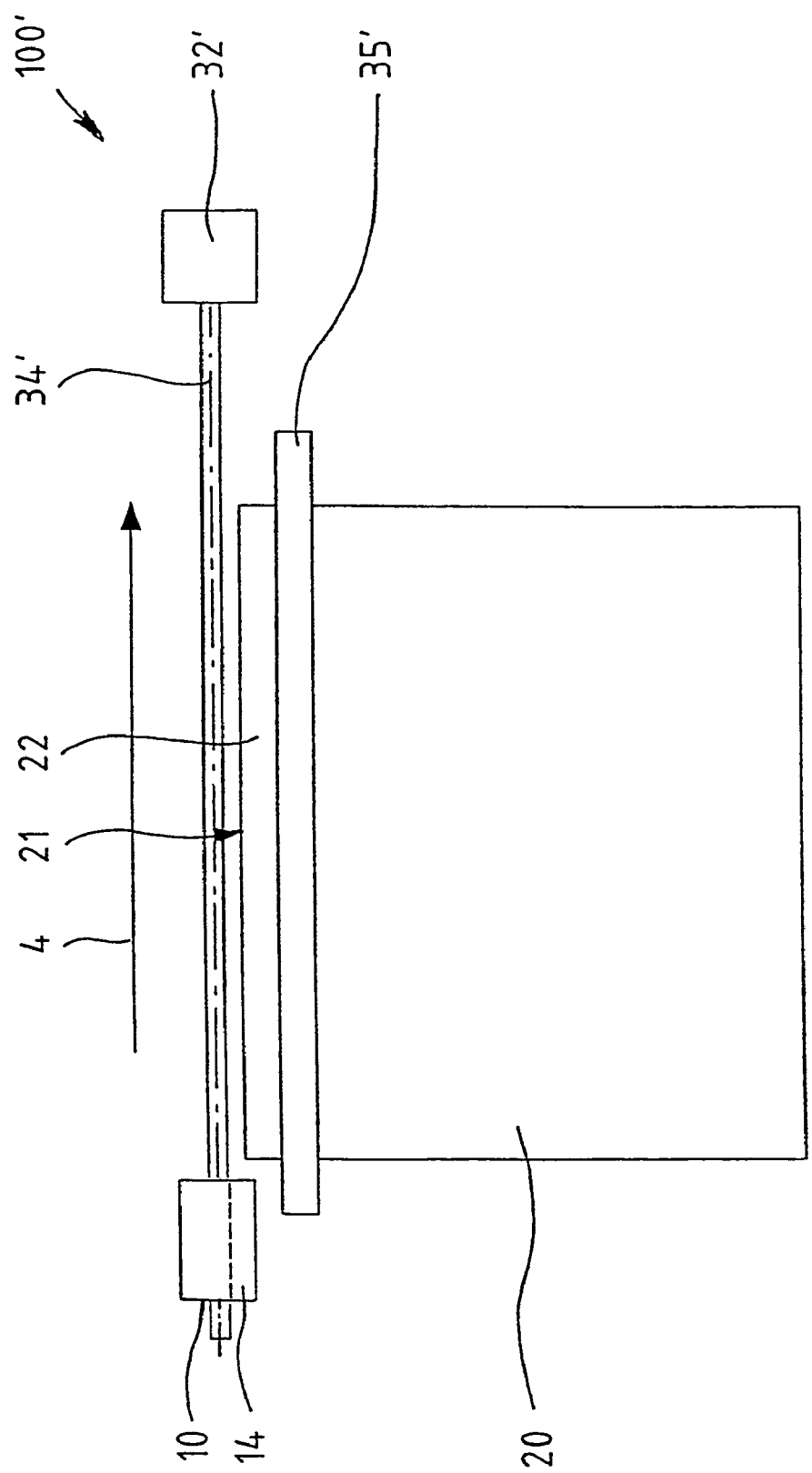

FIG. 6 shows an additional embodiment of an edge machining system 100', where the synthetic board 20 can be stationary secured using a securing device 35'. The smoothing device 10 is guided in a movable fashion at a spindle 34', which is driven by a motor 32' and is guided with its guiding groove 14 along the side edge 21 or the peripheral zone 22 of the synthetic board 20.

There has thus been shown and described a novel method for the production of a thermoplastic board comprising at least one smooth edge, device therefore, and edge machining system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for manufacturing a thermoplastic synthetic integral foam board having a coarsely porous core, sealed and smoothed side surfaces and at least one sealed and smoothed side edge, said method comprising the steps of:
    mixing a thermoplastic synthetic material in an extruder;
    extruding the thermoplastic synthetic material through a wide-slot nozzle to form a flat plastic web having a coarsely porous core;
    cooling and calibrating the plastic web on a calendar roll pair to form sealed and smoothed side surfaces;
    drawing off the plastic web; and
    heating the side edge of the plastic web in a guide groove of a smoothing device to at least a melting temperature of the thermoplastic synthetic material following calibration, while pressing the contact surface of the smoothing device against the side edge to smooth and densify the thermoplastic synthetic material, thereby to smooth and seal the side edge of the coarsely porous core while simultaneously maintaining adjacent peripheral surface areas of the plastic web in the smoothing device at a temperature below the softening temperature of the thermoplastic synthetic material by cooling.

2. A method as set forth in claim 1, wherein the thermoplastic synthetic material is hard PVC.

3. A method as set forth in claim 1, wherein a longitudinal side of the plastic web is trimmed prior to heating the side edge.

* * * * *